United States Patent [19]

Balbis et al.

[11] 4,436,127

[45] Mar. 13, 1984

[54] ADVANCED PROFILE RADIAL TIRE HAVING RELATIVELY HIGH INFLATION PRESSURE

[75] Inventors: Manuel G. Balbis; Colin V. King, both of Rome, Italy

[73] Assignee: The Firestone Tire & Rubber Company, Akron, Ohio

[21] Appl. No.: 357,028

[22] Filed: Mar. 11, 1982

[30] Foreign Application Priority Data

Apr. 29, 1981 [IT] Italy .................. 67578 A/81

[51] Int. Cl.³ .................. B60C 3/00; B60C 15/06
[52] U.S. Cl. .................. 152/209 R; 152/330 R; 152/353 R; 152/362 CS; 152/381.3
[58] Field of Search ....... 152/209 WT, 209 R, 209 D, 152/330 R, 352 R, 352 A, 353 R, 353 C, 353 G, 362 R, 362 CS, 381.3

[56] References Cited

U.S. PATENT DOCUMENTS

| | | | |
|---|---|---|---|
| 2,600,231 | 6/1952 | Ewart | 152/352 |
| 2,869,610 | 1/1959 | Lippmann et al. | 152/330 |
| 2,981,305 | 4/1961 | Reed | 152/330 |
| 3,237,672 | 3/1966 | McMannis | 152/352 |
| 3,542,107 | 11/1970 | Mills et al. | 152/352 |
| 3,773,096 | 11/1973 | Masson | 152/361 R |
| 4,352,383 | 10/1982 | Matsumoto et al. | 152/352 R |

Primary Examiner—Lois E. Boland
Attorney, Agent, or Firm—Ernst H. Ruf

[57] ABSTRACT

In an inflated tire and rim assembly (68) the improvement is in the profile (42) of the tire (40) having an aspect ratio (H/S) ranging from about 0.80 to about 0.90 and the maximum section width (S) is located at a height (h) of more than 55 percent of the section height (H), with the tire (40) being mounted on a rim (66) having a design width (DRW) of about 65 percent of the tire section width (S), while the width (TW) of the tread portion (50) is greater than 70 percent of the section width (S). The inflation pressure of the assembly (68) is a minimum of about 25 percent greater than the inflation pressure of a conventional profile tire (10) of an equivalent size and load carrying capacity.

6 Claims, 3 Drawing Figures

ADVANCED PROFILE RADIAL TIRE HAVING RELATIVELY HIGH INFLATION PRESSURE

TECHNICAL FIELD

The field of art to which this invention pertains is an inflated pneumatic tire and rim assembly wherein the tire is of known radial construction. The reinforcement of radial tires comprises a tread reinforcement and a body ply or carcass reinforcement, wherein the former extends under the tread and belts the body ply in a manner well known in the art.

It is known that while it is desirable to improve ride, durability and handling in pneumatic tires, usually an improvement in one of these qualities is accomplished by a partial degradation of one or more of the other qualities. For example, the lateral stability and handling properties of a radial ply tire can be improved by providing stiffening members in the bead area and sidewalls adjacent to the bead areas. This procedure, however, tends to cause a reduction in the riding quality of the tire, etc. In addition, changes in the configuration of the tread and ply reinforcement can cause changes in riding quality.

In order to reduce tire rolling resistance and gain an improvement in energy and fuel savings, it has been suggested to increase the tire inflation pressure which, however, can lead to unacceptable riding qualities in "conventional profile tires," which, when hereafter noted, refers to the inflated profile of the current "82 Series," (European Millimetric), or "P-80 Series" (ISO Standards), tires in current commercial production.

BACKGROUND ART

U.S. Pat. No. 3,237,672 to McMannis discloses a low-profile tire whose section height to section width equals 0.7–0.8 and whose section width is located at a point between 0.5–0.6 of the section height. This reference relates sectional diameter to tire pressure (FIGS. 4 and 5).

U.S. Pat. No. 3,542,107 to Mills, et al discloses a tire having the maximum cross-sectional width at a distance from the base line D at 60 percent of H. However, there appears to be neither mention of the aspect ratio nor the tread arc width of the tire.

U.S. Pat. No. 3,773,096 to Masson discloses a tire having an aspect ratio of 0.8, with the relationship of width of the tread to width of the tire being set forth as 70 percent.

U.S. Pat. No. 2,600,231 to Ewart discloses a tire having a given cross-sectional width A to tread width B to crown radius C to air pressure. However, this reference indicates that the particular geometry of the tire, by increasing the tire volume, allows the tire pressure to be reduced when operating at rated load.

U.S. Pat. No. 2,869,610 to Lippman, et al, discloses a tire which has a geometry enabling the tire to be inflated to 24 psi and to run cooler at higher speeds.

U.S. Pat. No. 2,981,305 to Reed discloses a tire operating under variable pressure. The only significance of this reference is its teaching that tires can be operated at higher as well as lower pressures to give different characteristics of ride.

None of the above-noted references, either singularly or in combination, set forth a tire having the specific profile of the present invention operable at higher tire inflation pressure while still providing the desired ride comfort.

DISCLOSURE OF THE INVENTION

The present invention provides a solution to the prior art problems of decreased ride confort with increasing tire inflation pressures by utilizing a unique tire profile having an aspect ratio in the range from about 0.80 to about 0.90. The maximum section width of this tire is located at a height of more than 55 percent of the section height. The tire of this profile, whose tread portion width is greater than 70 percent of the section width, is mounted on a rim whose design width is about 65 percent of the tire section width. This tire and rim assembly is then inflated to a pressure of at least 0.5 bar greater than the inflation pressure of a conventional profile tire of equivalent size and load carrying capacity.

This combination of tire profile and inflation pressure produces a tire having a spring rate less than that of a conventional profile tire at equal inflation. The advanced profile tire will thus operate at a minimum of about 25 percent greater inflation pressure than a conventional profile tire at about the same applied load and about equal tire deflection, i.e. about equal spring rate, resulting in comparable ride comfort characteristics. The lesser spring rate of the described advanced profile tire will more readily permit higher inflation pressures without an accompanying degradation of ride comfort. In addition, the wide tread arc and high maximum section width location effectively reduce the distance of the mechanical link between the lower sidewall profile and the tread, thereby producing handling characteristics comparable to lower aspect radial tires.

The presently-preferred best mode profile includes an aspect ratio of 0.84 to 0.86 as optimum since ride comfort tends to diminish below this range while handling performance tends to diminish above this range. Other features and advantages of the present invention will become more readily understandable by persons skilled in the art when following the best mode description in conjunction with several drawings.

BEST MODE FOR CARRYING OUT THE INVENTION

Figure 1:
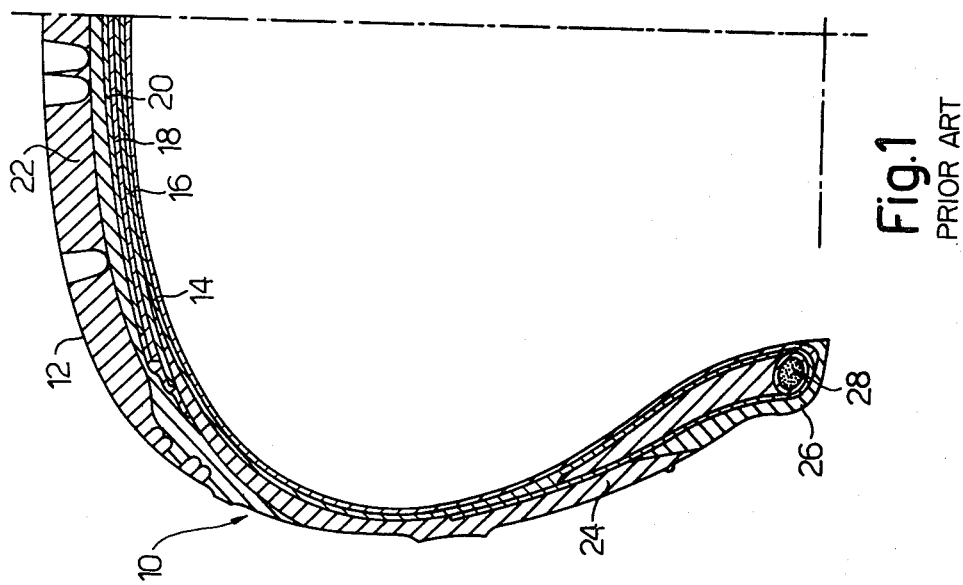
FIG. 1 is a schematic radial half section of an as-cured prior art conventional profile tire.

FIG. 1 represents a half section of a prior art radial tire 10 of conventional profile 12 designed to operate at the regular inflation pressure, generally in the range of 1.7–2.4 bar (about 25–35 psi). The construction of prior art conventional profile tire 10, which is merely described for reference and background purposes, may consist of a single radial body ply 14, preferably of a fabric material such as rayon, topped by two tread plies or belts 16, 18 of reinforcing material, such as for example of steel cord construction, with ply 18 in turn being topped by a single cap ply 20 preferably of a fabric material such as nylon. The tread 22, in contact with the road, may be of any desired composition and design.

Body ply 14 is generally folded back around an inextensible bead reinforcement 28, with body ply 14 and cap ply 20 being completely covered with rubber components which include tread 22, sidewalls 24 and beads 26, all of well known construction.

Figure 3:
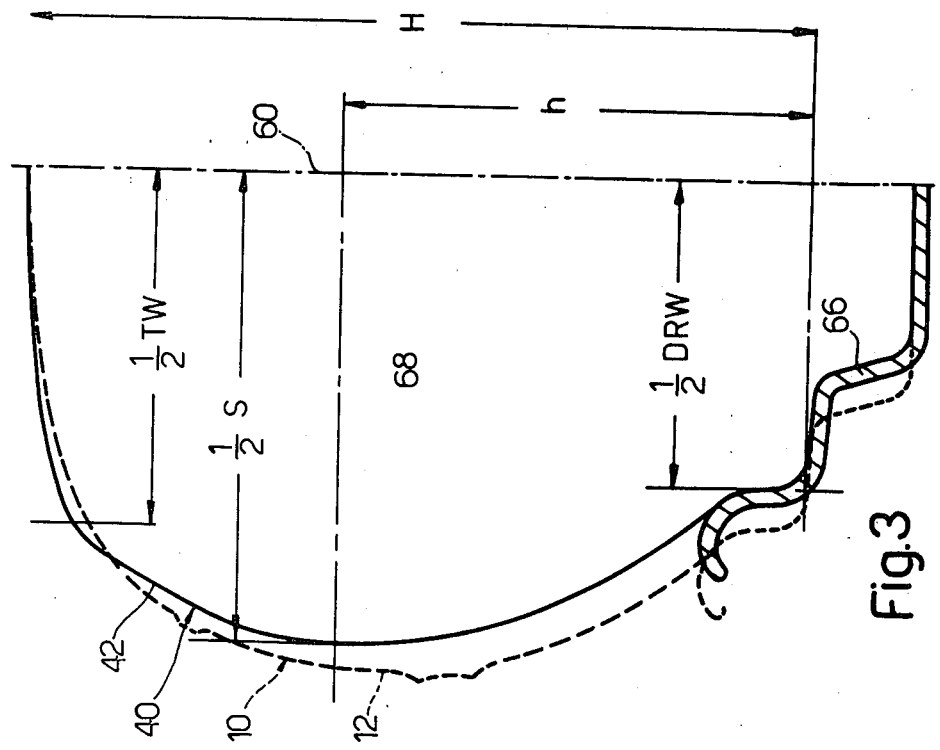
FIG. 3 is a schematic radial half section of the inflated advanced profile tire in accordance with the present invention superimposed on a schematic radial half section, in dashed lines, of the inflated conventional profile tire of an equivalent size and load carrying capacity.

The inflated conventional profile 12 of prior art tire 10, as best seen as the dashed outline in FIG. 3, is based on an aspect ratio (section height/section width) of about 0.80–0.82, with the maximum section width thereof being located at a height of about 50 percent of the section height measured from the base of the tire section. Tire 10 also has a tread arc reference width of about 75 percent of section width and is secured on a tire rim having a design width of about 70 percent of section width.

Figure 2:
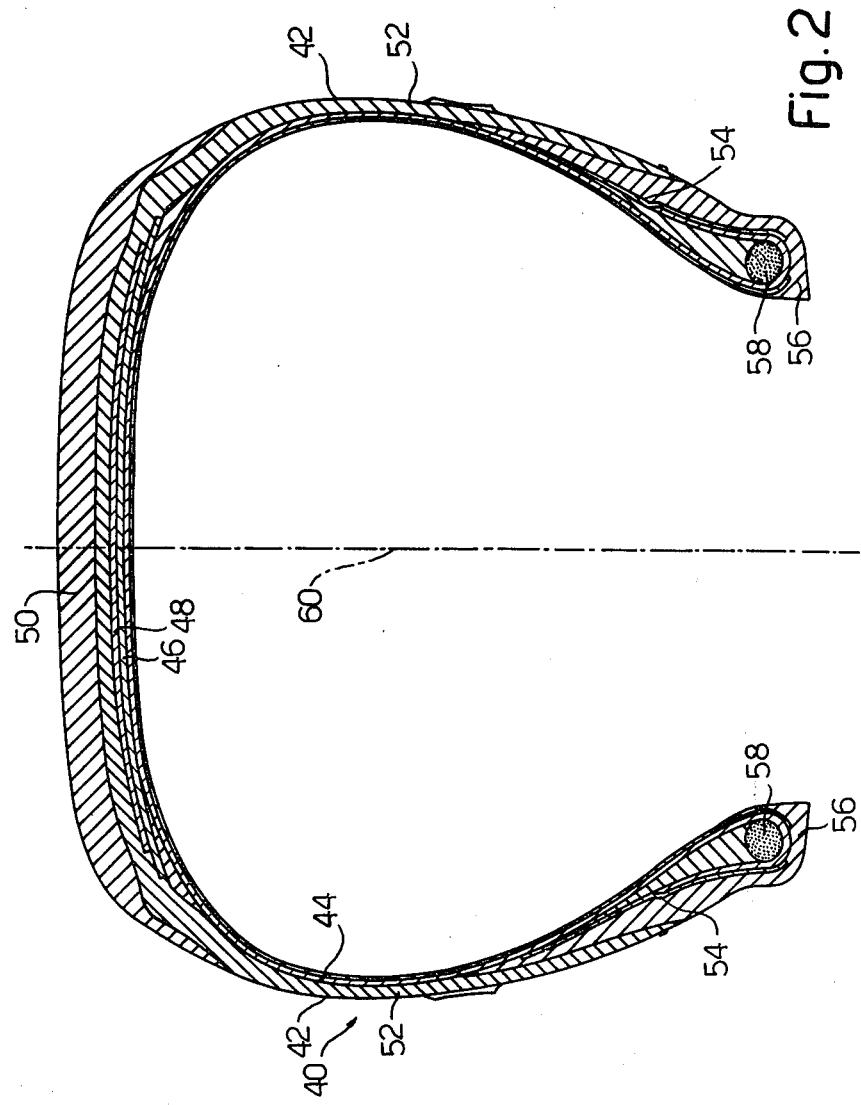
FIG. 2 is a schematic radial section of an as-cured advanced profile tire embodied in the present invention.

FIG. 2 is a schematic radial section of the advanced profile radial tire 40 embodied in the present invention, with FIG. 2 showing the tire 40 in the as-cured, uninflated condition. The construction of tire 40, for reference and disclosure purposes only, may include a radial carcass or body ply 44, preferably of a fabric material such as nylon, topped with two tread plies 46, 48 of reinforcing material, such as for example of aramid cord construction. These plies are completely covered with rubber coatings in the usual manner and in particular by a tread portion 50, sidewalls 52 and beads 56, with the latter incorporating an inextensible bead reinforcement 58. As shown in FIG. 2, a lower sidewall reinforcement 54, by virtue of its location, provides relative stiffness in that area. The construction and curing of tire 40 is in accordance with generally known radial tire manufacturing techniques.

Advanced profile 42 of tire 40, shown in its inflated state as the solid outline in FIG. 3, is based on an aspect ratio (H/S) in the range from about 0.80 to about 0.90. The maximum section width (S) of tire 40 is located at a height (h) of more than 55 percent of the section height (H). The width (TW) of tread portion 50 is greater than 70 percent of section width (S) while the design rim width (DRW) of rim 66 (FIG. 3) is about 65 percent of section width (S). One preferred specific advanced profile 42 has an aspect ratio of about 0.85 and has its maximum section width (S) located at a height (h) of about 60 percent of section height (H). The width (TW) of tread portion 50 is about 76 percent of section width (S) while the design rim width (DRW) of rim 66 is about 65 percent of section width (S). It should of course be understood that profile 42 is allochiral or symmetrical about vertical centerline 60.

Advanced profile tire 40 when mounted on a rim 66, of any desired conventional shape, resulting in tire-rim assembly 68, allows the usage of relatively high inflation pressures in the range of 2.5–4.5 bar (about 37–66 psi) to achieve low tire rolling resistance while maintaining ride comfort and handling characteristics comparable with prior art radial tire 10 of a conventional profile operating at regular inflation pressure in the range of 1.7–2.4 bar (about 25–35 psi).

FIG. 3 shows an inflated profile comparison between previously defined conventional radial tire 10 at about 2.0 bar inflation pressure and advanced profile tire 40 at about 2.75 bar inflation pressure, with the tires being of equivalent size and load carrying capacity. The combination of higher inflation pressure with the advanced profile 42 of tire 40 allows the use of narrower tire 40 in place of the wider but lower pressure prior art tire 10 of conventional profile.

Actual static load/deflection test data when translated into spring rate in units of pounds/inch deflection at an inflation pressure of 2.55 bar shows that while conventional profile tire 10 has a spring rate of 990 pounds per inch, advanced profile tire 40 has a spring rate of but 915 pounds per inch. Similarly, at an inflation pressure of 3.16 bar, tire 10 has a spring rate of 1,129 pounds per inch deflection whereas tire 40 has a deflection of but 1,021 pounds per inch. These figures prove that advanced profile radial tire 40 has a spring rate that is less than that of conventional profile tire 10 at equal inflation pressures. Extrapolation of data of this type shows that tire 40 will operate at about 0.5 bar (about 7 psi) higher inflation pressure than conventional profile tire 10 at the same applied load and at about equal tire deflection while having comparable ride comfort characteristics. In addition, further testing of conventional tires 10 and competitive tires similar to the design, construction and inflation pressure of tire 10 have shown that advanced profile tire 40, at its higher inflation pressure, has significantly less rolling resistance while still maintaining acceptable ride comfort based upon subjective tests.

While the aspect ratio of advanced profile tire 40 ranges from about 0.80 to about 0.90, the range of 0.84 to 0.86 is optimum in terms of ride comfort and handling performance. When the aspect ratio dips much below 0.85, the ride comfort starts to diminish whereas if the aspect ratio starts to exceed 0.85, the handling qualities start to diminish.

Extensive test results clearly demonstrate that advanced profile tire 40, having the previously-discussed design parameters, when mounted and inflated in the manner previously discussed, clearly demonstrate that tire 40 will maintain an acceptable level of ride comfort at the elevated inflation pressures due to its lesser spring rate compared to conventional profile tires at lesser inflation pressures which tend to negate the adverse effect on ride comfort associated with elevated inflation pressures in conventional profile radial tires. The wide tread width and high maximum section width location effectively reduce the distance of the mechanical link between the lower sidewall profile and the tread, thereby producing handling characteristics comparable to lower aspect ratio tires.

From the foregoing description, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. In an inflated tire and rim assembly wherein the tire includes a tread portion, a tread reinforcement in the tread portion, a pair of sidewalls respectively on opposite sides of said tread portion, a pair of bead portions respectively at the inner edges of said sidewalls, a lower sidewall reinforcement adjacent each of said bead portions and sidewall inner edges, a bead reinforcement in each of said bead portions, and a radial carcass reinforcement extending from one bead portion to the other, the improvement being in the profile of said tire characterized in:

a. the tire having a section height H and a section width S, the aspect ratio (H/S) being in the range from about 0.80 to about 0.90;

b. the maximum section width (S) being located at a height (h) of more than 55 percent of said section height (H), with the design width (DRW) of said rim being about 65 percent of said section width (S);

c. the width (TW) of said tread portion being greater than 70 percent of said section width (S);

d. the inflation pressure of said tire being a minimum of about 25 percent greater than the inflation pressure of a conventional profile tire of equivalent size, said assembly being operable at said greater inflation pressure at about the same load capacity and at about the same tire deflection as a conventional profile tire while having acceptable ride comfort characteristics; and e. said lower sidewall reinforcement providing relative stiffness in its area of location.

2. The improved tire profile according to claim 1 wherein said aspect ratio is in the range of about 0.84 to about 0.86.

3. The improved tire profile according to claims 1 or 2 wherein said maximum section width is located at about 60 percent of said section height.

4. The improved tire profile according to claims 1 or 2 wherein the width of said tread portion is about 76 percent of said maximum section width.

5. The improved tire profile according to claims 1 or 2 wherein said inflation pressure is at least 0.5 bar greater than the inflation pressure of said conventional profile tire of equivalent size.

6. The improved tire profile according to claim 1 wherein said aspect ratio is about 0.85, said maximum section width is located at about 60 percent of section height and the width of said tread portion is about 76 percent of said section width, said width of said tread portion and the location of said maximum section width effectively reducing the distance of the mechanical link between the lower sidewall profile and the tread portion, thereby producing handling characteristics comparable to lower aspect ratio tires.

* * * * *